United States Patent

[11] 3,603,976

[72] Inventors T. O. Paine
Administrator of the National Aeronautics and Space Administration with respect to an invention of;
Tage O. Anderson, Arcadia, Calif.

[21] Appl. No. 860,751
[22] Filed Sept. 24, 1969
[45] Patented Sept. 7, 1971

[54] MODULAR ENCODER
5 Claims, 4 Drawing Figs.

[52] U.S. Cl. .......... 340/347 DD, 178/66, 179/15, 235/154, 178/50
[51] Int. Cl. .......... H03K 13/256
[50] Field of Search .......... 178/66, 67, 50; 179/15; 325/38, 39; 340/204, 146.1, 347, 348–351; 235/153, 154

[56] References Cited

UNITED STATES PATENTS

| | | | |
|---|---|---|---|
| 3,030,614 | 4/1962 | Lehan et al. .......... | 179/15 X |
| 3,358,083 | 12/1967 | Helm .......... | 179/15 X |
| 3,398,239 | 8/1968 | Rabow .......... | 340/347 X |

*Primary Examiner*—Maynard R. Wilbur
*Assistant Examiner*—Charles D. Miller
*Attorneys*—J. H. Warden, Monte F. Mott and G. T. McCoy

ABSTRACT: A biorthogonal encoder of modular design with each module operating in a serial or cyclic mode. The number of modules M is equal to N/2 if N, the number of bits of the data word, is even, or to (N+1)2 if N is odd. Each module includes a 2-bit shift register, a storage bit and a mod 2 gate. The input to the register is a mod 2 function of the register's output and that of the storage bit. The outputs of all the M modules are added mod 2 to provide the $2^N$ bits of each code word in sequence.

INVENTOR.
TAGE O. ANDERSON
BY J. H. Warden
[signature]
ATTORNEYS

INVENTOR.
TAGE O. ANDERSON
BY J. H. Warden
G. T. McCoy
ATTORNEYS

MODULAR ENCODER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to encoding circuitry and, more particularly, to a modular-type encoder for generating a biorthogonal code.

2. Description of the Prior Art

The use of coding to minimize the introduction of errors during various phases of telemetry operations is well known. Typically, data in the form of multibit data words are converted into multibit code words. The conversion is performed by an encoder. In many operations, employed in space exploration communications, N-bit data words are converted into $2^N$-bit code words. One example of a code which has been employed in one application of space communication is the biorthogonal code. Although generating such a code is more difficult than generating other codes, such as cyclic codes, since the former is highly structured, the biorthogonal code has been selected because of the ease with which it may be decoded. Briefly stated, a biorthogonal code word can be generated symbol-by-symbol or bit-by-bit by mod 2 mapping between the original data or information word and a binary sequence of the same number of variables of the information word.

In designing a biorthogonal code generator, hereafter referred to as the encoder as in designing any other circuit, high design flexibility and minimization of circuits or hardware to reduce production and maintenance cost without sacrificing reliability are primary design objectives. It has been found that high design flexibility may be achieved by providing a biorthogonal encoder with modular design characteristics.

OBJECTS AND SUMMARY OF THE INVENTION

It is a primary object of the present invention to provide a new improved encoder.

Another object of the present invention is to provide a reliable biorthogonal encoder which requires fewer circuits than a comparable biorthogonal encoder.

A further object of the present invention is to provide a biorthogonal encoder with modular design characteristics.

Still another object of the present invention is to provide a simple, yet highly reliable encoder which has modular design characteristics and one which requires a minimum number of circuits to generate $2^N$-bit code words for N-bit data words.

These and other objects of the invention are achieved by providing a biorthogonal encoder of modular design, where each module operates in a continuous serial or cyclic mode. The number of modules M, is equal to N/2 if N is even or to (N+1) if N is odd. Each module consists of a 2-bit shift register, a storage bit and a mod 2 gate, the latter being often referred to in the art as an Exclusive OR gate. The input to the register is a mod 2 function between its output and the storage bit. The lowest order module is clocked or shifted around at a selected bit rate and each high order module is shifter around at one-fourth the rate of a lower order module. The outputs of the modules are added mod 2 to provide the $2^N$ bits of each code word, in sequence.

The novel features of the invention are set forth with particularity in the appended claims. The invention will best be understood from the following description when read in conjunction with the accompanying drawings.

DESCRIPTION OF THE PREFERRED EMBODIMENTS

The present invention may best be described by first considering a specific example of a biorthogonal code and a conventional prior art biorthogonal encoder for generating such a code. The following Table 1 represents a dictionary of 16, 16-bit biorthogonal code words for 16, 4-bit data words.

Table 1

| Data Word | Biorthogonal Code Word | | | |
|---|---|---|---|---|
| 0000 | 0000 | 0000 | 0000 | 0000 |
| 0001 | 0101 | 0101 | 0101 | 0101 |
| 0010 | 0011 | 0011 | 0011 | 0011 |
| 0011 | 0110 | 0110 | 0110 | 0110 |
| 0100 | 0000 | 1111 | 0000 | 1111 |
| 0101 | 0101 | 1010 | 0101 | 1010 |
| 0110 | 0011 | 1100 | 0011 | 1100 |
| 0111 | 0110 | 11 | 0110 | 1001 |
| 1000 | 0000 | 0000 | 1111 | 1111 |
| 1001 | 0101 | 0101 | 1010 | 1010 |
| 1010 | 0011 | 1100 | 1100 | 1100 |
| 1011 | 0110 | 0110 | 1001 | 1001 |
| 1100 | 0000 | 1111 | 1111 | 0000 |
| 1101 | 0101 | 1010 | 1010 | 0101 |
| 1110 | 0011 | 1100 | 1100 | 0011 |
| 1111 | 0110 | 1001 | 1001 | 0110 |

Figure 1:
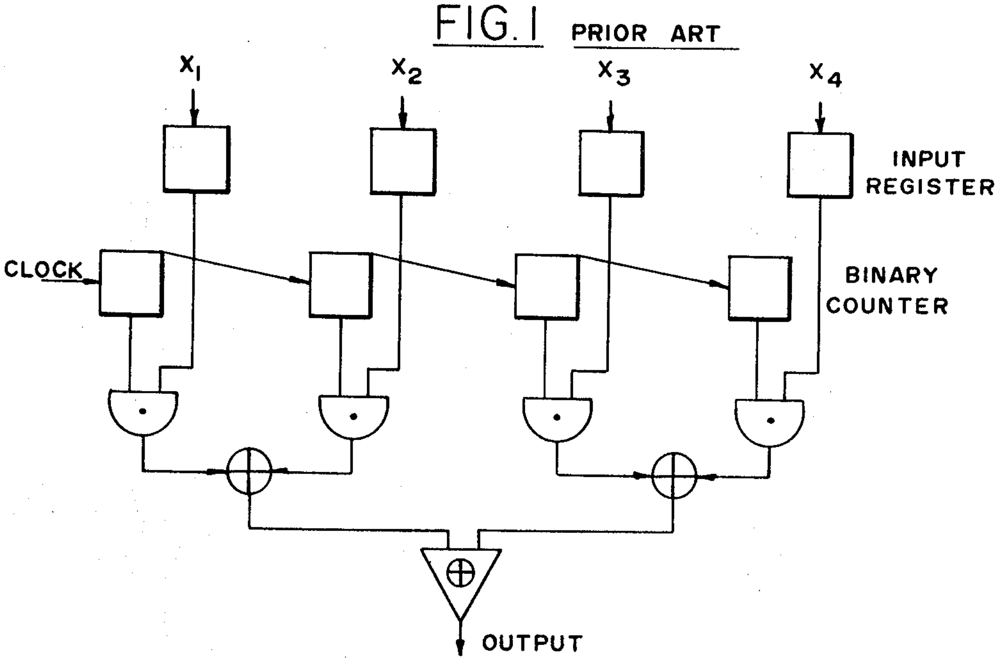
FIG. 1 PRIOR ART
FIG. 1 is a simple diagram of a prior art encoder.

FIG. 1 to which reference is now made is a block diagram of a conventional prior art encoder for generating such code words. The prior art encoder includes a 4-bit input register, which is loaded with the 4 bits, $X_1$, $X_2$, $X_3$ and $X_4$ of a data word, such as 0110. The encoder also includes a 4-bit binary counter which is clocked at a desired code word bit rate. Each bit of the binary counter is supplied together with a corresponding data bit to an AND gate. The mod 2 function between the outputs of the AND gates, is formed by cascading 2-term mod 2 or Exclusive-OR gates. Thus, by setting the counter to 0000 and sequentially clocking it, the biorthogonal code word 0011, 1100, 0011, 1100 is generated.

It is clear that in such an encoder, a 4-bit counter and a 4-bit register are needed to generate a $2^4$-bit biorthogonal word. Thus, eight (2×4) storage units are needed. Generalizing, the number 4 by N, to generate a $2^N$-bit biorthogonal code word for an N-bit data word, 2N storage units are needed. Unlike such an arrangement, in the novel modular biorthogonal encoder of the present invention 3/2 N storage units are needed when N is even. If N is odd, a maximum of 3/2(N+1) storage units are required. A reduction in the number of storage units is realized with the present invention as long as N>3: which is the case in all practical applications. It should be pointed out that the reduction in the number of storage units which is realizable by the present invention is but one of its advantages.

The design of the biorthogonal encoder of the present invention may best be explained by considering the following mod 2 algebraic expressions, $$X \oplus 0 = X$$
$$X \oplus X = 0$$
$$X \oplus X \oplus X = X$$

,
,
,

That is,

Odd number of $X = X$.
Even number of $X = 0$.

This suggests that if a set of variables in a shift register is continuously shifted around and entered through a mod 2 function between the output of the register and another variable, each variable in the register will be mod 2'ed every other cycle with the entry variable. This then suggests the mod 2 mapping between the entered variables and a binary sequence that is sought. This point may be clarified by considering the block diagram of FIG. 2 and the following truth table shown as Table 2.

TABLE 2

| Clock | P | Q | R |
|---|---|---|---|
| 1 | $X_2$ | $X_1$ | $X_0$ |
| 2 | $X_2$ | $X_0 \oplus X_2$ | $X_1$ |
| 3 | $X_2$ | $X_1 \oplus X_2$ | $X_0 \oplus X_2$ |
| 4 | $X_2$ | $X_0$ | $X_1 \oplus X_2$ |
| 5 | $X_2$ | $X_1$ | $X_0$ |
| . | . | . | . |
| . | . | . | . |
| . | . | . | . |

Figure 2:
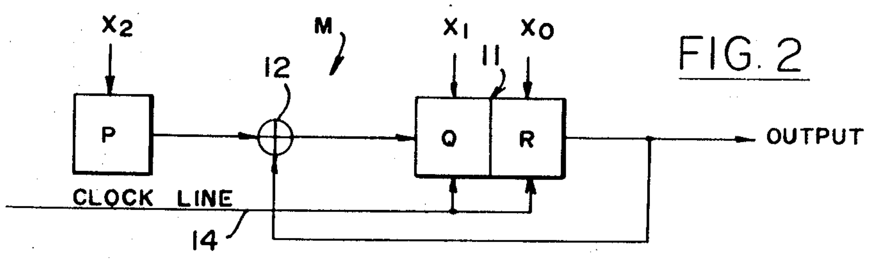
FIG. 2 is a diagram of the basic encoder module constructed in accordance with the present invention.

FIG. 2 is a block diagram of a modular unit or module in accordance with the teachings of the present invention. The module, designated M, comprises a storage unit P and a 2-bit shift register comprising units Q and R. A mod 2 gate 12 supplies the register input as a mod 2 function between its output and unit P, which acts as a holding unit. The units or stages Q and R are clocked by pulses in a clock line 14. The variables $X_0$, $X_1$ and $X_2$ are loaded into units R, Q and P. Table 2 represents the truth table for the module M.

If $X_0=O$, the truth table for the module M is as shown in the following Table 3.

TABLE 3 TZ

| Clock | P | Q | R |
|---|---|---|---|
| 1 | $X_2$ | $X_1$ | 0 |
| 2 | $X_2$ | $X_2$ | $X_1$ |
| 3 | $X_2$ | $X_1 \oplus X_2$ | $X_2$ |
| 4 | $X_2$ | 0 | $X_1 \oplus X_2$ |
| 5 | $X_2$ | $X_1$ | 0 |

Therefrom it should be seen that the output of R which represents the module's output is the mod 2 mapping between the entered variables $X_1$ and $X_2$ and a 2-bit binary truth table as shown in the following Table 4.

TABLE 4

| |
|---|
| 00 |
| 01 |
| 10 |
| 11 |

From the foregoing it should thus be appreciated that the module M (FIG. 2) may act as a biorthogonal encoder for a 2-bit data word. By loading the units, Q and R with the two variables, $X_1$ and $X_2$ of a 2-bit word and, thereafter, sequentially clocking the register 11, the output of the module is a sequence of bits of a 4-bit biorthogonal code word.

If the output of a second identical module whose entries are O, $X_3$ and $X_4$ is added mod 2 with the output of the first module, and if the second module is clocked every fourth clock pulse, the combined output will be a mod 2 mapping between the entered variables $X_1$, $X_2$, $X_3$ and $X_4$ and a 4-bit truth table, shown in the following Table 5.

TABLE 5

| |
|---|
| 0000 |
| 0001 |
| 0010 |
| 0011 |
| 0100 |
| 0101 |
| 0110 |
| 0111 |
| 1000 |
| 1001 |
| 1010 |
| 1011 |
| 1100 |
| 1111 |

Figure 3:
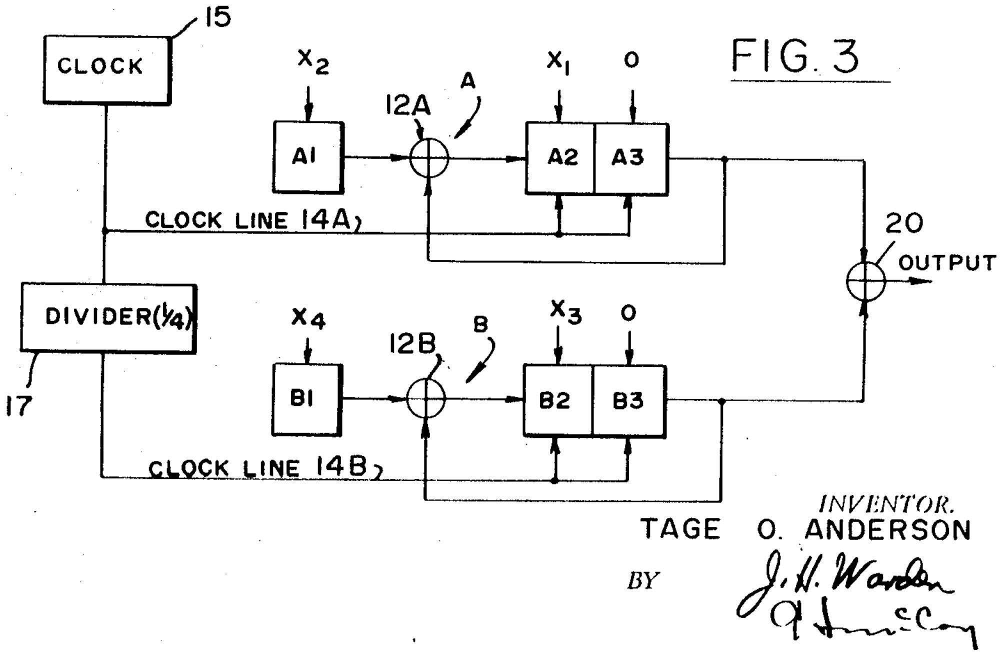
FIG. 3 is a diagram of a 2-module encoder, constructed in accordance with the teachings of the present invention.

Such a 2-module arrangement is shown in FIG. 3 to which reference is now made. Therein A & B designate the two modules, A1, A2 and A3 designate the three storage units of module A, while B1, B2 and B3 designate the units of module B. Numeral 15 designates a source of clock pulses, simply referred to as a clock. The output of clock 15 is directly applied to A2 and A3 of module A, while the output is applied to B2 and B3 of a higher order module through a divider 17 which divides the clock rate by four. Thus, the units of register 11 of module B are clocked at one-fourth the rate of the units of module A. The outputs of the two modules are added mod 2 by gate 20, whose output represents the output of the 2-module encoder. In practice the four bits $X_1$, $X_2$, $X_3$ and $X_4$ of any data word such as 0110 are loaded into A2, A1, B2 and B1, respectively and thereafter clock pulses are supplied by clock 15, to produce in sequence the 16 bits of the biorthogonal code word for data word 0110.

From a comparison of FIGS. 3 and 1 it becomes apparent that by employing the modular biorthogonal encoder of the present invention, a reduction in the number of storage units and gates is realized. In the prior art encoder (FIG. 1) $2\times4=8$ storage units with four AND gates and three mod 2 gates are needed. By comparison in the novel encoder (FIG. 3) only $2\times3=6$ storage units are needed and the AND gates are eliminated. The only added requirement in the novel encoder is the divider 17 which may be implemented with two simple flip-flops.

In addition to the reduction in circuits or hardware the modular design characteristic of the novel encoder disclosed herein is of particular advantage. Such modular design lends itself to simple integrated circuitry fabrication techniques. Furthermore, the encoding capacity of any biorthogonal encoder may be increased by increments of two by adding additional modules thereto. For example, a 6-bit biorthogonal encoder can be converted to an 8-bit unit by adding an additional module and an additional mod 2 gate. Thus, the modular structure should be regarded of particular significance.

Although herebefore the invention has been described in connection with a 2-module 4-bit biorthogonal encoder, it should be apparent that the teachings are not limited thereto. Rather, the teachings may be employed to implement a biorthogonal encoder of any desired number of modules, depending on the number of bits of the data words. Defining the number of bits of a data word as N, the number of modules Z may be expressed as, $$Z=N/2 \text{ if } N \text{ is even;}$$
$$Z=(N+1)/2 \text{ if } N \text{ is odd.}$$

Figure 4:
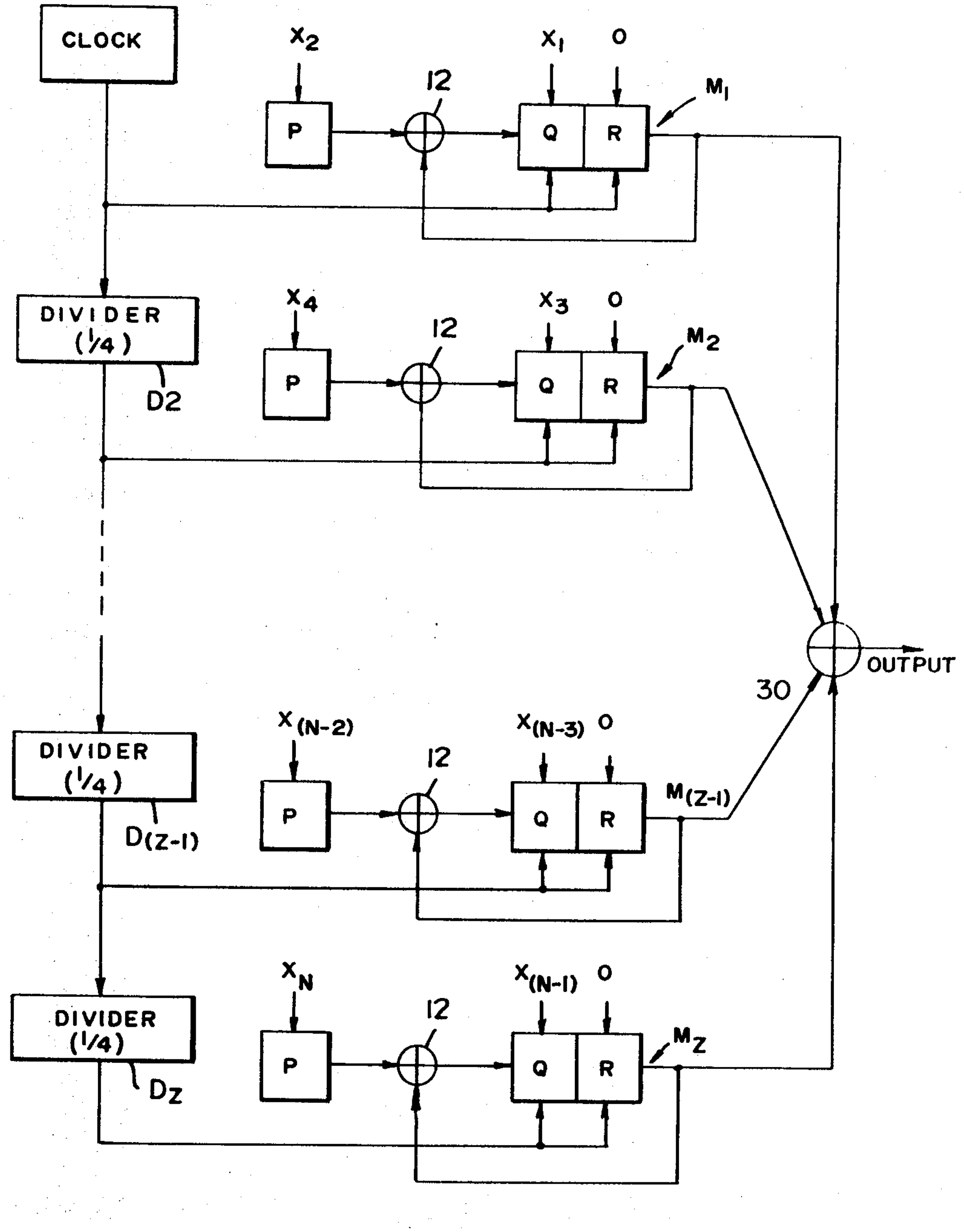
FIG. 4 is a diagram of an embodiment of the present invention comprising an arbitrary number of three modules.

As in the two-module embodiment shown in FIG. 3, in an encoder of Z modules, each higher order module is clocked at one-fourth the rate of a lower order module. Such a generalized embodiment is diagrammed in FIG. 4 to which reference is now made. Therein, the Z modules are designated MZ, $M_1$, $M_2$ .....$M_z$. The clock dividers for modules $M_2$ ......$M_z$ are designated $D_2$ ...$D_z$ while numeral 30 generally designates mod 2 gates necessary to mod 2 add the outputs of the various modules to provide the encoder output.

Although particular embodiments and illustrations have been described herein, it is recognized that modifications and variations may readily occur to those skilled in the art and, consequently, it is intended that the claims be interpreted to cover such modifications and equivalents.

1. A modular encoder for generating a biorthogonal code word of $2^N$ bits for a data word of N bits, N being an integer and not less than three, comprising:

Z encoder modules, Z being equal to N/2 if N is even or (N+1)/2 if N is odd, each module including storage means which each include three binary storage units, two of said units receiving two bits of said N-bit data word and the third being always initially set to a binary 0 state, for receiving two different ones of said N bits of the data word and having an output;

means for clocking said modules with clock pulses, each module being clocked at one-fourth the clocking rate of a lower order module; and means for mod 2 adding the output of said Z modules to provide an encoder output representing one of the code word bits in response to each clock pulse.

2. The arrangement as recited in claim 1 wherein said three units include first and second units defining a clockable shift register, said first unit defining the input unit of said register and the second unit defining the output unit of said shift register, and a third storage unit, each module further including means for supplying said first unit with a binary signal which is a mod 2 function of the binary signals in said second and third storage units, the two data word bits being storable in said first and third storage units, with the lower order bit of the two being stored in said first storage unit.

3. A modular encoder for generating a biorthogonal code word of $2^N$ bits for a data word of N bits, N being an integer which is not less than three, comprising:

Z encoder modules, Z being equal to N/2 if N is even or to (N+1) /2 if N is odd, each module including a two-stage clockable shift register, having an input and an output, a storage unit, and means for supplying the input of said register with a signal which is a mod 2 function of the bits at the output of said register ans said storage unit;

means for clocking the register of each module at a rate which is one-fourth the clocking rate of a lower module; and output means for mod 2 adding the outputs of the registers of said modules to provide each bit of said code word.

4. The arrangement as recited in claim 3 wherein each module receives two different bits of the N bits of the data word, said two bits being storable in the input stage of said shift register and said storage unit and the output stage of said shift register being set to a binary 0 state.

5. The arrangement as recited in claim 4 wherein the storage unit of the highest order module is set to a binary 0 state when N is odd.